(12) United States Patent
Mitsui et al.

(10) Patent No.: US 8,936,248 B2
(45) Date of Patent: Jan. 20, 2015

(54) BOOT SEAL FOR VARIABLE COMPRESSION-RATE ENGINE

(75) Inventors: Kenichi Mitsui, Kiyosu (JP); Katsuhisa Ota, Kiyosu (JP); Kaoru Itou, Okazaki (JP)

(73) Assignees: Toyoda Gosei Co., Ltd., Aichi-pref. (JP); Toyota Jidosha Kabushiki Kaisha, Toyota-shi (JP)

( * ) Notice: Subject to any disclaimer, the term of this patent is extended or adjusted under 35 U.S.C. 154(b) by 361 days.

(21) Appl. No.: 13/408,078

(22) Filed: Feb. 29, 2012

(65) Prior Publication Data

US 2012/0248712 A1 Oct. 4, 2012

(30) Foreign Application Priority Data

Mar. 28, 2011 (JP) ................................ 2011-070002

(51) Int. Cl.
 *F16J 3/00* (2006.01)
 *F02B 75/04* (2006.01)
 *F16J 3/04* (2006.01)

(52) U.S. Cl.
 CPC ............... *F02B 75/041* (2013.01); *F16J 3/041* (2013.01); *F16J 3/042* (2013.01)
 USPC ........................................................ 277/634

(58) Field of Classification Search
 CPC .................................. F16J 15/52; F16J 15/36
 USPC ................................................. 277/634–636
 See application file for complete search history.

(56) References Cited

U.S. PATENT DOCUMENTS

| | | | | |
|---|---|---|---|---|
| 4,279,131 A | * | 7/1981 | Pringle | 464/113 |
| 4,558,869 A | * | 12/1985 | Grove et al. | 277/315 |
| 5,145,191 A | * | 9/1992 | Stewart et al. | 277/636 |
| 5,443,043 A | | 8/1995 | Nilsson et al. | |
| 6,139,027 A | * | 10/2000 | Biekx | 277/634 |
| 6,962,339 B1 | * | 11/2005 | Spurgeon | 277/358 |
| 8,136,816 B1 | * | 3/2012 | Lou | 277/315 |
| 2010/0196644 A1 | * | 8/2010 | Yamagishi et al. | 428/36.9 |

FOREIGN PATENT DOCUMENTS

| | | |
|---|---|---|
| JP | H04-261844 A | 9/1992 |
| JP | H06-504826 A | 6/1994 |
| JP | H07-026981 A | 1/1995 |
| JP | H07-506652 A | 7/1995 |
| JP | H09-157447 A | 6/1997 |
| JP | H11-336897 A | 12/1999 |
| JP | 2000-291713 A | 10/2000 |
| JP | A-2000-274529 | 10/2003 |
| JP | 2004-060736 A | 2/2004 |

(Continued)

*Primary Examiner* — Vishal Patel
(74) *Attorney, Agent, or Firm* — Posz Law Group, PLC

(57) ABSTRACT

A boot seal for variable compression-rate engine includes a boot-seal element, and a reinforcement member. The boot-seal element includes an inner layer, and an outer layer. The inner layer is disposed on the inner face of the boot-seal element, and is composed of a fluorinated rubber. The outer layer is disposed on a more outer side of the boot-seal element than is the inner layer. Moreover, the boot-seal element is formed in a circumferentially developed state so as to have circumferential ends, and is then completed by joining the circumferential ends with each other. Thus, the boot-seal element makes an elastically deformable cylindrical bellows shape having a root that dents inward diametrically. In addition, the reinforcement member is disposed in the root of the cylindrical bellows-shaped boot-seal element at least.

15 Claims, 11 Drawing Sheets

(56) References Cited

FOREIGN PATENT DOCUMENTS

| | | |
|---|---|---|
| JP | 2004-522102 A | 7/2004 |
| JP | A-2006-308002 | 11/2006 |
| JP | A-2007-078154 | 3/2007 |
| JP | A-2007-504419 | 3/2007 |
| JP | A-2007-303385 | 11/2007 |
| JP | 2008-025742 A | 2/2008 |
| JP | 2009-115105 A | 5/2009 |
| JP | A-2009-097449 | 5/2009 |
| JP | A-2009-114989 | 5/2009 |
| WO | WO 2005/026590 | 3/2005 |

\* cited by examiner

US 8,936,248 B2

BOOT SEAL FOR VARIABLE COMPRESSION-RATE ENGINE

INCORPORATION BY REFERENCE

The present invention is based on Japanese Patent Application No. 2011-70,002, filed on Mar. 28, 2011, the entire contents of which are incorporated herein by reference.

BACKGROUND OF THE INVENTION

1. Field of the Invention

The present invention relates to a boot seal for variable compression-rate engine.

2. Description of the Related Art

An engine has been known, engine into which the fuel-air mixture is supplied while changing the compression rate in compliance with the traveling conditions of vehicle (that is, a so-called variable compression-rate engine (being abbreviated to as "VCR" engine hereinafter)). The "VCR" engine makes it possible to retrieve higher torques by heightening the compression rate at the time of lower loads, and makes it possible to inhibit knocking from occurring by lowering the compression rate at the time of higher loads.

In such a "VCR" engine, at least one of a cylinder block and a crankcase is moved to change the relative positions of the two. Thus, the ratio between the maximum volume of a combustion chamber and the minimum volume within a piston cylinder in the cylinder block is changed, that is, the compression rate of a fuel-air mixture that results from the up/down movement of a piston is changed.

Note herein that, in engines, the fuel-air mixture within the combustion chambers might possibly leak out into the crankcase through clearances between the pistons and the piston cylinders. The leaked-out fuel-air mixture is commonly called as blow-by gases, and contains uncombusted fuels. The blow-by gasses are flowed back into an inlet pipe by way of a crank chamber within the crankcase.

However, when the cylinder block and the crankcase change the relative positions between the two as in the above-described "VCR" engine, the blow-by gases or engine oils might possibly flow out from between the cylinder block and the crankcase to eventually dissipate or scatter to the outside of the "VCR" engine. As a result, the dissipating or scattering blow-by gases or engine oils might possibly cause such problems that they might contaminate the peripheries of the "VCR" engine or they might corrode metallic component parts around the "VCR" engine.

Hence, Japanese Unexamined Patent Publication (KOKAI) Gazette No. 2007-303,385 has heretofore proposed conventionally to provide a cylinder block 91 with a dented groove 90 in the outer peripheral face over the entire circumference, as shown in FIG. 10. Moreover, an annular sealing member 92 is assembled with the dented groove 90, and comes in close contact with the inner peripheral face of a crankcase 93 slidably, as illustrated in FIG. 11.

However, in such a conventional boot seal for "VCR" engine, the spaces above and below the sealing member 92 are shut off only by the sliding contact between the outer peripheral face of the sealing member 92 and the inner peripheral face of the crankcase 93. Consequently, it is required to manufacture the sealing member 92 highly accurately in the configuration and characteristics in order to secure the airtightness between the cylinder block 91 and the crankcase 93.

Moreover, there has been the following problem: the more the airtightness is upgraded during the sliding between the cylinder block 91 and the crankcase 93 via the sealing member 92, the more the sliding resistance increases between the cylinder block 91 and the crankcase 93 by way of the sealing member 92. As a result, the slidability has lowered between the cylinder block 91 and the crankcase 93 via the sealing member 92. Therefore, it has been longed for to secure high airtightness even with use of a low-precision sealing member.

In addition, it is also believed that the distance of relative movement would be augmented between the cylinder block 91 and the crankcase 93 from now on.

Meanwhile, Japanese Unexamined Patent Publication (KOKAI) Gazette No. 2000-274,529, discloses an expansible/contractible member that is employed for vibration absorber for precision measurement device. Moreover, Japanese Unexamined Patent Publication (KOKAI) Gazette No. 2007-78,154 discloses another expansible/contractible member that is employed for boot for constant-velocity universal joint. The disclosed expansible/contractible members are made of rubber, and are formed as a bellows-shaped configuration, respectively. The inventors of the present invention have been thinking of utilizing such a bellows-shaped expansible/contractible member in order to cover the clearance between a cylinder block and a crankcase.

However, general rubbers are used to make the conventional expansible/contractible members, and are weak materials against acidity and high temperatures. On the other hand, the blow-by gases leaking out from combustion chambers exhibit acidity and high temperatures. Accordingly, when the conventional expansible/contractible members being made of general rubbers are used as they are for a boot seal for "VCR" engine, the general rubbers might probably have degraded. Consequently, it is possible as well to think of using a fluorinated rubber whose heat resistance is high enough to make a boot seal for "VCR" engine. However, since not only fluorinated rubbers are expensive but also a boot seal for "VCR" engine has a large size relatively, using a fluorinated rubber to manufacture a boot seal for "VCR" engine has resulted in raising the material cost for manufacturing the boot seal higher. Therefore, it is not expedient to use the conventional expansible/contractible members, which are disclosed in Japanese Unexamined Patent Publication (KOKAI) Gazette No. 2000-274,529 and Japanese Unexamined Patent Publication (KOKAI) Gazette No. 2007-78,154, as they are for making a boot seal for "VCR" engine without any modification.

SUMMARY OF THE INVENTION

The present invention has been developed in view of the aforementioned circumstances. It is therefore an object of the present invention to provide a boot seal for "VCR" engine, boot seal which exhibits not only a higher sealing property but also better heat resistance and acid resistance.

For example, a boot seal for "VCR" engine according to the present invention is mounted onto a "VCR" engine that changes a volume of a combustion chamber by changing relative positions between a cylinder block and a crankcase; and the boot seal covers between the cylinder block and the crankcase, and has an opposite end to be fixed to the cylinder block and another opposite end to be fixed to the crankcase. Specifically, the present boot seal comprises:

a boot-seal element including an inner layer being disposed on an inner face thereof and being composed of a fluorinated rubber, and an outer layer being disposed on a more outer side than is the inner layer, the boot-seal element being formed in a circumferentially developed state so as to have circumferential ends and then being completed by joining the circumferential ends with each other, thereby making an elastically deformable cylindrical bellows shape having a root that dents inward diametrically; and a reinforcement member being disposed in the root of the cylindrical bellows-shaped boot-seal element at least.

The present boot seal is a sealing member to be mounted onto one of the above-described "VCR" engines, and takes on a cylindrical bellows shape. Accordingly, the present boot seal can deform so as to follow the relative movements between the cylinder block and the crankcase. Consequently, the present boot seal can seal between the cylinder block and the crankcase airtightly.

The present boot seal comprises the boot-seal element. The boot-seal element includes an inner layer being composed of a fluorinated rubber on the inner face. The fluorinated rubber is a material that is good in the heat resistance, oil resistance and chemical resistance. As a result, the fluorinated rubber can inhibit the present boot seal from deteriorating even when the boot-seal element is exposed to the blow-by gases on the inner face.

Moreover, it is possible to use materials other than fluorinated rubbers in order to make the outer layer of the boot-seal element. Accordingly, it is possible to make a used amount of the fluorinated rubber less for making the present boot seal as a whole. Consequently, it is possible to keep down the material cost lower for manufacturing the present boot seal.

In addition, the present boot seal comprises the reinforcement member being disposed in at least one of the roots of the cylindrical bellows-shaped boot-seal element that dent inward diametrically. Accordingly, the boot-seal element exhibits higher rigidity at the root. Consequently, the reinforcement member inhibits the boot-seal element from inverting outward diametrically at one of the roots.

Moreover, the boot-seal element is completed by joining its circumferential ends with each other after it is formed in a circumferentially developed state. As a result, the boot-seal element can be made with ease. Therefore, it is possible to manufacture the present boot seal inexpensively.

Thus, the present boot seal exhibits not only a higher sealing property but also better heat resistance and acid resistance, because the boot-seal element includes an inner layer being made of a fluorinated rubber.

The reinforcement member can preferably comprise an annular reinforcement member extending annularly around the boot-seal element over the circumferential direction entirely. If such is the case, it is possible to securely inhibit the boot-seal element from inverting, because the annular reinforcement member inhibits the boot-seal element from elongating in the circumferential length when the boot-seal element tries to expand outward diametrically.

The reinforcement member can preferably comprise a reinforced fibrous assembly being composed of a nonwoven fabric or a woven or knitted fabric that is made of reinforced fiber; and the reinforced fibrous assembly can be disposed between the inner layer of the boot-seal element and the outer layer. The reinforced fibrous assembly enables the boot-seal element to expand and/or contract slightly in the circumferential direction while enhancing the boot-seal element in the strength against deformations. As a result, it is possible to inhibit the boot-seal element from inverting effectively without ever hindering the boot-seal element from expanding and/or contracting.

The reinforced fibrous assembly can preferably comprise a woven or knitted fabric exhibiting a meshed structure. In this instance, an enhanced joint strength is exhibited between the inner layer of the boot-seal element and the outer layer, because the inner layer and the outer layer can be joined at the meshes in the meshed structure of the woven or knitted fabric making the reinforced fibrous assembly. Moreover, it is possible to inhibit the boot-seal element from deforming at the section in which the reinforced fibrous assembly is disposed, because the inner layer and outer layer go in into the meshes in the meshed structure.

It is preferable that the reinforced fibrous assembly can include woven yarns; the woven yarns can exhibit woven directions inclining with respect to the circumferential direction of the boot-seal element; and the woven yarns can be joined at intersections thereof. If such is the case, it is possible to inhibit the boot-seal element from inverting effectively while allowing the boot-seal element to expand and/or contract slightly, because the reinforced fibrous assembly comprises meshes being laid out in the directions that incline with respect to the circumferential direction of the boot-seal element. Note that the term, "yarns," implies not only yarns but also threads.

The reinforced fibrous assembly can preferably comprise a woven fabric exhibiting a woven structure. In this instance, the reinforced fibrous assembly not only allows the boot-seal element to expand and/or contract more or less in the circumferential direction, but also can inhibit the boot-seal element from inverting more effectively.

The reinforced fibrous assembly can preferably be disposed so as to extend from the root of the boot-seal element to apart thereof to be fixed to the cylinder block at least. The roots of the boot-seal element, and the part of the boot-seal element to be fixed to the cylinder block are parts at which stresses are likely to concentrate when the boot-seal element expands and/or contracts. As a result, the reinforced fibrous assembly being disposed in these parts can inhibit the boot-seal element from cracking, tearing or breaking. As for such a woven fabric, Raschel woven fabrics are available, for instance.

The reinforced fibrous assembly can preferably include joints being joined in the circumferential direction of the boot-seal element so as to superimpose one another in their thickness-wise directions. This optional means or setting enables the joints to exhibit an enhanced joint strength.

It is preferable that the annular reinforcement member can include a wire stock exhibiting a high tensile strength than does the boot-seal element; and the wire stock can be buried in the root of the cylindrical bellows-shaped boot-seal element. Since the wire stock inhibits the root of the cylindrical bellows-shaped boot-seal element from expanding diametrically, it is possible to inhibit the boot-seal element from inverting outward diametrically.

Moreover, it is preferable that the wire stock can be provided with irregularities on a surface thereof at predetermined intervals in an extending direction thereof. The inner layer of the boot-seal element and the outer layer are hooked onto the irregularities in the surface of the wire stock. Accordingly, it is possible to prevent the inner layer and outer layer of the boot-seal element from misaligning or slipping off in relation to the wire stock. Consequently, it is possible to inhibit the boot-seal element from expanding diametrically in the circumferential direction.

In addition, it is preferable that the wire stock can be fluffed or looped at predetermined intervals in the extending direction. The thus fluffed or looped wire stock can inhibit the inner layer and outer layer of the boot-seal element from misaligning or slipping off in relation to the wire stock, because the fluffed or looped wire stock hooks the inner layer and outer layer. As a result, the fluffed or looped wire stock can inhibit the boot-seal element from expanding diametrically in the circumferential direction.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
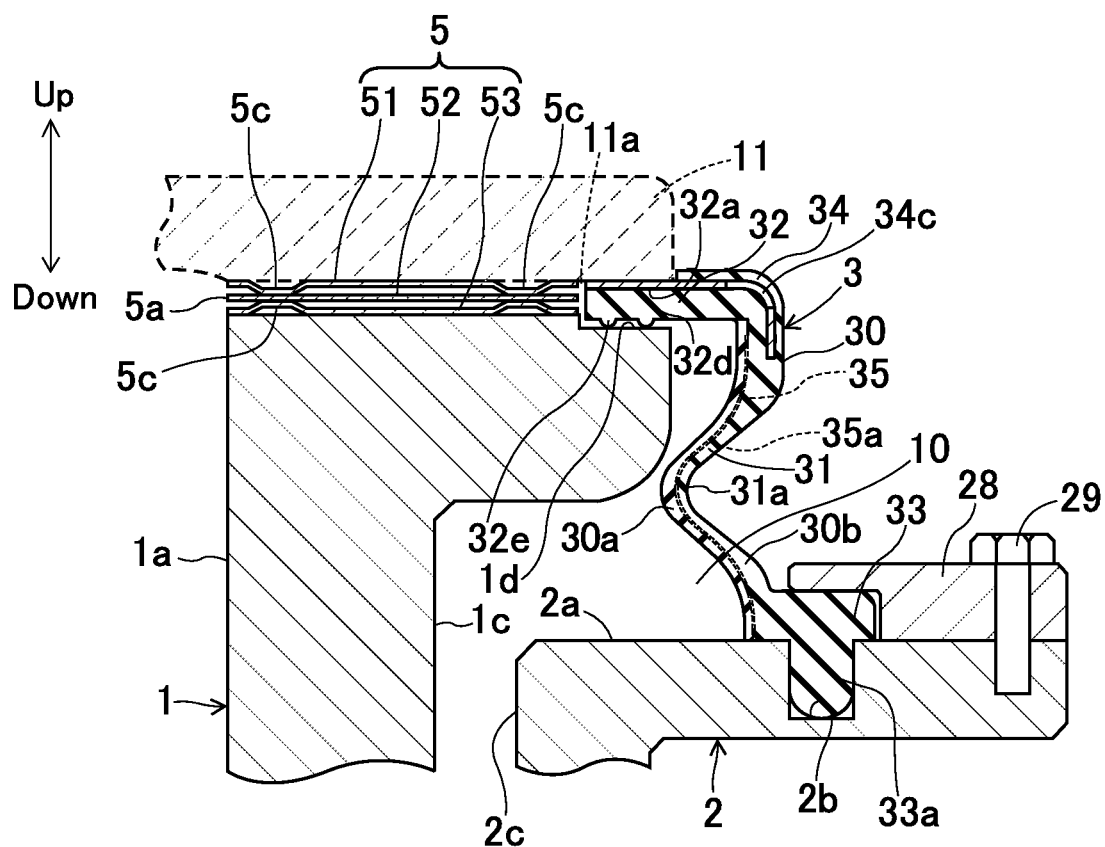
FIG. 1 is a partial cross-sectional diagram being taken in the direction of the arrow-headed line "1"-"1" in FIG. 2, and illustrates a boot seal that is directed to Embodiment No. 1 of the present invention, and which is mounted on a "VCR" engine.

Having generally described the present invention, a further understanding can be obtained by reference to the specific preferred embodiments which are provided herein for the purpose of illustration only and not intended to limit the scope of the appended claims.

Embodiment No. 1

A boot seal for "VCR" engine according to Embodiment No. 1 of the present invention will be described hereinafter with reference to the accompanying drawings. Embodiment No. 1 is directed to a boot seal 3 shown in FIG. 1. As illustrated in the drawing, the boot seal 3 is mounted on a "VCR" engine to cover a clearance 10 between a cylinder block 1 and a crankcase 2 in the "VCR" engine, in which the cylinder block 1 and the crankcase 2 change their relative positions in the up/down direction in order to change the compression rate.

The cylinder block 1 takes on a rectangular shape substantially when being viewed from the top, and is put in place inside the crankcase 2 that has a box shape substantially. The cylinder block 1 is made movable with respect to the crankcase 2 in the up/down direction. The cylinder block 1 has an outer peripheral face $1c$ that faces an inner peripheral face $2c$ of the crankcase 2 by way of the clearance 10. Note that the blow-by gases leaking out from the combustion chambers distribute within the clearance 10.

Figure 2:
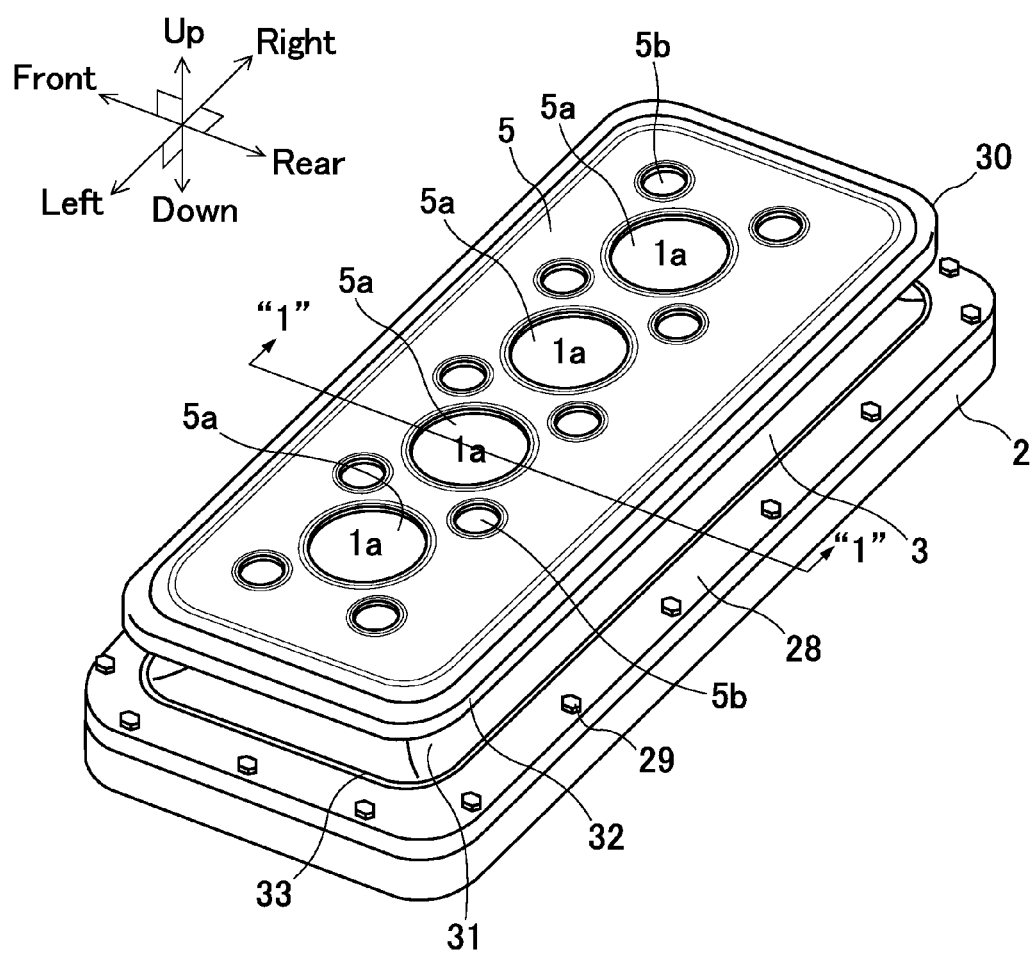
FIG. 2 is a perspective diagram for illustrating the present boot seal according to Embodiment No. 1.

As illustrated in FIG. 2, the cylinder block 1 is provided with a plurality of cylinders $1a$ in series. The cylinders $1a$ make a piston cylinder, respectively. A piston (not shown) is inserted into each of the cylinders $1a$ movably in the up/down direction. In the upper part of each of the cylinders $1a$, a combustion chamber is formed between the top face of each of the pistons and the bottom face of a later-described cylinder head 11. The combustion cycle, which comprises the intake, compression, explosion and exhaust of fuel-air mixtures of fuel and air, is repeated in order to increase and decrease the volume of each of the combustion chambers repeatedly. A ratio between the volume of the combustion chambers when the pistons are at the bottom dead center and that when they are at the top dead center is referred to as the "compression ratio."

The crankcase 2 takes on a box shape substantially so as to form a crank chamber (not shown) in the interior. The cylinder block 1 is inserted into the crank chamber at the lower part movably up and down. Moreover, the crankcase 2 takes on a rectangular frame shape so as to surround the cylinder block 1 at the upper part. Within the crank chamber of the crankcase 2, the pistons are put in place at positions that correspond to the positions at which the cylinders $1a$ are put in place. A driving means, such as a not-shown cam shaft, moves the cylinder block 1 with respect to the crankcase 2 in the up/down direction. A magnitude of the movement distance is set herein so as to fall in a range of from 15 to 20 mm approximately, for instance. As the cylinder block 1 moves with respect to the crankcase 2 in the up/down direction, the compression ratios of fuel-air mixtures change in the combustion chambers that the bottom face of the cylinder head 11, the cylinders $1a$ of the cylinder block 1 and the top face of the pistons form. The compression ratios of fuel-air mixtures in the combustion chambers are increased and decreased in order to control diving torques that the "VCR" engine produces.

As illustrated in FIG. 1, the cylinder block 1 is provided with the cylinder head 11 at the upper part while interposing a metallic cylinder head gasket 5 therebetween.

The cylinder head gasket 5 is held between the cylinder block 1 and the cylinder head 11, thereby sealing between the cylinder block 1 and the cylinder head 11. The cylinder head gasket 5 is made of a metal, and is formed as a rectangular sheet-like shape having dimensions that are virtually equal to those of the flat top face in the cylinder block 1. Specifically, the cylinder head gasket 5 comprises a laminate, which includes an outer metallic sheet 51, an intermediate metallic sheet 52 and an inner metallic sheet 53. The outer metallic sheet 51, the intermediate metallic sheet 52, and inner metallic sheet 53 are stacked in this order, and are then integrated by crimping. For example, the outer metallic sheet 51 is made of a stainless steel (e.g., SUS as per JIS (i.e., Japanese Industrial Standard)), and has a thickness of from 0.2 to 0.3 mm. The intermediate metallic sheet 52 is made of SUS, and has a thickness of from 0.6 to 0.8 mm. The inner metallic sheet 53 is made of SUS, and has a thickness of from 0.2 to 0.3 mm.

As illustrated in FIG. 2, the cylinder head gasket 5 is provided with a plurality of openings 5a for piston, and a plurality of other openings 5b for peripheral member. The openings 5a are formed in a quantity that conforms to the number of the cylinders 1a in the cylinder block 1, that is, the number of the relative-displacement type "VCR" engine's pistons (not shown). Likewise, the other openings 5b are formed in a quantity that conforms to the number of peripheral members around the pistons, that is, the number of constituent members for the relative-displacement type "VCR" engine's cooling system and lubricating system.

As illustrated in FIGS. 1 and 2, sealing protuberances 5c are formed at the outer circumferential rim, respectively, on the outer metallic sheet 51 and inner metallic sheet 53. Moreover, the openings 5a for piston, and the openings 5b for peripheral member are also provided with a sealing protuberance 5c at the peripheral rim, respectively. The sealing protuberances 5c are processed circularly by press forming. The sealing protuberances 5c of the outer metallic sheet 51 project downward, whereas the sealing protuberances 5c of the inner metallic sheet 53 project upward. When the intermediate metallic plate 52 is held between the outer metallic plate 51 and the inner metallic plate 53 at the sealing protuberances 5c that are formed to project downward and upward respectively, the protuberances 5c undergo elastic deformation in the up/down direction. As a result, the cylinder head gasket 5 seals between the cylinder block 1 and the cylinder head 11 reliably.

The boot seal 3 according to Embodiment No. 1 comprises a boot-seal element 30, and a reinforcement member 35. The boot-seal element 30 includes a cylindrical bellows-shaped deformer 31, a cylinder-block fitting 32, and a crankcase fitting 33. The deformer 31 is made deformable elastically. The cylinder-block fitting 32 is a part for fixing the boot seal 3 to the cylinder block 1. The crankcase fitting 33 is a part for fixing the boot seal 3 to the crankcase 2.

The deformer 31 makes a bellows-like configuration being provided with one root 31a that dents inward diametrically. Moreover, the deformer 31 is integrated with the cylinder-block fitting 32 at one of the axially opposite ends (i.e., at the top end in FIG. 1), and is integrated with the crankcase fitting 33 at the other one of the axially opposite ends (i.e., at the bottom end in the drawing).

The cylinder-block fitting 32 is made up of an embedding end 32a, and a metallic ring 34. The metallic ring 34 is formed as a rectangularly annular shape, and is embedded in the embedding end 32a partially at one of the opposite ends. Note that a metallic sheet with a thickness of from 0.6 to 0.8 mm, which is made with use of SUS (i.e., a stainless steel as per JIS), is used to make the metallic ring 34. Moreover, the top face of the metallic ring 34 is flush with the top face of the cylinder head gasket 5 substantially. In addition, the metallic ring 34 takes on a halved rectangularly cylindrical shape, or an inverted rectangular pan-like shape, which is bent downward by 90 degrees at the outer circumferential rim. Moreover, the metallic ring 34 is provided with a plurality of anchor holes 34c. The anchor holes 34c are formed on the inner peripheral side of the metallic ring 34 over the entire periphery, and are formed to pierce the metallic ring 34 in the up/down direction.

The embedding end 32a, and the metallic ring 34 are integrated firmly, because the embedding end 32a is molded by insert molding so as to make it go into the anchor holes 34c partially. Moreover, a sealer 32d is disposed on the inner-peripheral-side bottom face of the metallic ring 34 that is subjected to the insert molding together with the sealer 32d. The sealer 32d is formed as a rectangularly annular sheet shape, and is integrated with the embedding end 32a. In addition, the sealer 32d is provided with sealing ribs 32e on the bottom. The sealing ribs 32e make a rectangularly annular configuration, and project downward.

After placing the cylinder-block fitting 32 on a shoulder 1d of the cylinder block 1 at the sealer 32d, the cylinder-block fitting 32 is fixed to the cylinder block 1 by holding the metallic ring 34 and sealer 32d between the shoulder 1d of the cylinder block 1 and the bottom face 11a of the cylinder head 11. As a result, the sealing ribs 32e come in press contact with the shoulder 1d. Thus, the cylinder-block fitting 32 is mounted on the cylinder block 1 while producing high sealing capability.

The crankcase fitting 33 makes a rectangularly annular configuration. Moreover, the crankcase fitting 33 is provided with a downwardly-projecting rectangularly annular lock 33a on the bottom face over the entire periphery.

When the crankcase fitting 33 is fixed onto the crankcase 2, the lock 33a of the crankcase fitting 33 is inserted from above into a lock groove 2b that is impressed into the top face 2a of the crankcase 2. Thus, the crankcase fitting 33 is mounted on the crankcase 2 while producing high sealing capability, because it is held between the crankcase 2 and a retainer 28 that makes a rectangularly annular shape. Moreover, the retainer 28 is fixed onto the top face 2a of the crankcase 2 by fastening bolts 29.

The boot-seal element 30 comprises an inner layer 30a, and an outer layer 30b. The inner layer 30a is put in place on an inner side of the boot-seal element 30. The outer layer 30b is put in place on a much outer side of the boot-seal element 30 than is the inner layer 30a. The inner layer 30a is composed of a fluorinated rubber, whereas the outer layer 30b is composed of an ethylene acrylic rubber (e.g., AEM). As for the fluorinated rubber for making the inner layer 30a, it is possible to select one of the following to use: fluororubbers, such as vinylidene fluoride rubbers (e.g., FKM), tetrafluoroethylene-propylene rubbers (e.g., FEPM) and tetrafluoroethylene-perfluorovinyl ether rubbers (e.g., FFKM); or copolymers of the fluororubbers. Of these, a vinylidene fluoride rubber (e.g., FKM) can preferably be selected to make the inner layer 30a. In the present boot seal 3 according to Embodiment No. 1, note that FKM, one of the fluorinated rubbers, is used to make the inner layer 30a.

The outer layer 30b is formed of the deformer 31, and the cylinder-block fitting 32 and crankcase fitting 33 that are put in place above and below the deformer 31 integrally, as shown in FIG. 1. On the other hand, the inner layer 30a covers the inner peripheral face of the outer layer 30b entirely in order to make the inner face of the boot-seal element 30 entirely.

Figure 3:
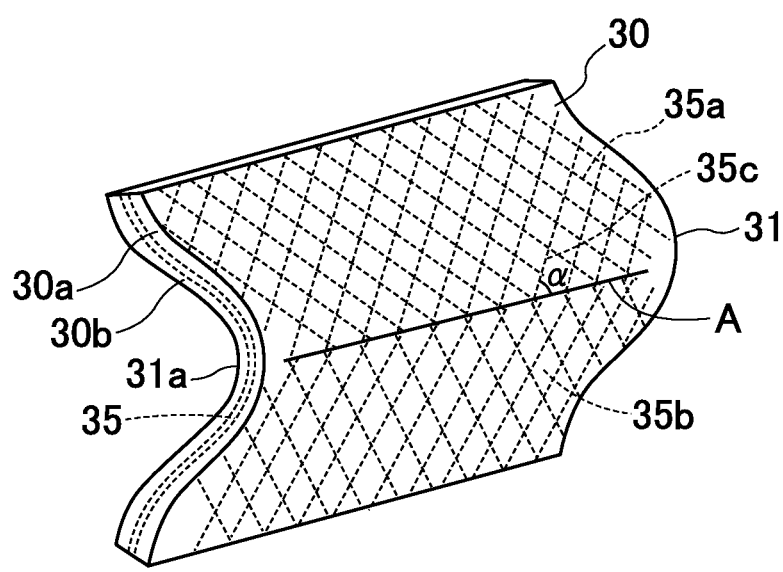
FIG. 3 is an explanatory diagram for illustrating a layout of a net, one of the constituent elements of the present boot seal according to Embodiment No. 1, which is buried in the present boot seal.

As illustrated in FIG. 3, a net 35a is used to make the reinforcement member 35. The net 35a is formed by Raschel weaving. The Raschel woven net 35a is a woven fabric that not only exhibits a woven structure but also exhibits a latticelike meshed structure. As for the yarns for weaving the Raschel woven net 35*a*, it is possible to use a filament that is made of one of the following: reinforced resinous fibers, such as polyamide (e.g., nylon 66) resinous fibers, aromatic amide resinous fibers and polyphenylene sulfide (e.g., PPS) resinous fibers; or inorganic fibers, such as carbon fibers, glass fibers and ceramic fibers. The Raschel woven net 35*a* has meshes whose opening magnitude is 2 mm longitudinally as well as latitudinally. Moreover, the Raschel woven net 35*a* comprises weaving yarns whose thickness is 470 dtex (or 420 denier). In addition, the Raschel woven net 35*a* can even be impregnated with an epoxy resin in order to prevent it from wrinkling.

Figure 5:
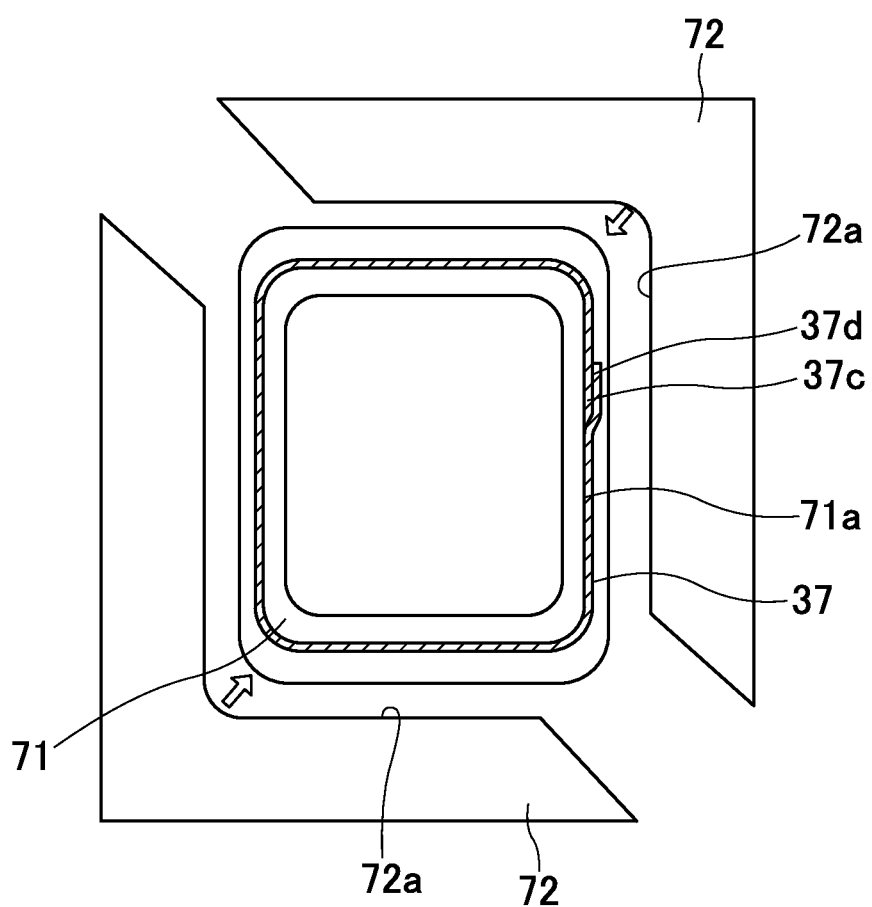
FIG. 5 is a plan-view diagram for illustrating how the present boot seal according to Embodiment No. 1 is manufactured wherein how the sheet subassembly is put in place around the inner mold of the molding die is depicted.

The reinforcement member 35 makes an annular reinforcement member that is buried annularly in the circumferential direction of the boot-seal element 30 entirely. Moreover, the reinforcement member 35 is put in place between the inner layer 30*a* and the outer layer 30*b*. In addition, the reinforcement member 35 is joined together at the opposite ends in the circumferential direction of the resulting boot-seal element 30, as shown in FIG. 5. Note that the opposite ends overlap one another at the joint in the thickness-wise direction of the resultant reinforcement member 35. Moreover, the reinforcement member 35 is put in place so as to bridge the interval from the top end of the deformer 31 to the bottom end. In addition, the reinforcement member 35 overlaps with the lower part in the metallic ring 34 of the cylinder-block fitting 32 at the top end partially, as shown in FIG. 1. Note that the bottom end of the reinforced member 35 is put in place in the crankcase fitting 33.

In the present boot seal 3 according to Embodiment No. 1, the reinforcement member 35 comprises weaving yarns that incline by an angle α (by 45 degrees, for instance) with respect to the circumferential direction "A" of the boot-seal element 30, as shown in FIG. 3. It is preferable that the inclination angle α can preferably fall in a range of from 15 to 75 degrees, more preferably, from 25 to 65 degrees. As a result, it is possible to inhibit the boot-seal element 30 from inverting at the root 31*a*, because the net 35*a* is likely to expand and contract in the circumferential direction while allowing the boot-seal element 30 to expand and contract in the up/down direction. Note that the circumferential direction "A" of the boot-seal element 30 is parallel to the extension or development direction of the root 31*a* in the deformer 31.

Figure 4A:
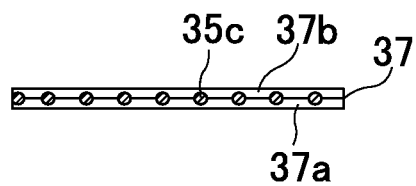
FIG. 4A is a first explanatory diagram for illustrating how the present boot seal according to Embodiment No. 1 is manufactured wherein a sheet subassembly, another one of the constituent elements of the present boot seal, is depicted.

A manufacturing process for the present boot seal 3 according to Embodiment No. 1 will be hereinafter described. As illustrated in FIG. 4A, an unvulcanized FKM calender sheet 37*a* is molded with use of heat rollers after kneading an FKM material to soften. Moreover, an unvulcanized AEM calender sheet 37*b* is also molded with use of heat rollers after kneading an AEM material to soften. Then, the resulting FKM calender sheet 37*a* and AEM calender sheet 37*b* are pressure bonded with use of heat rollers after putting the net 35*a* between them. Thus, a sheet subassembly 37 is completed.

Figure 4B:
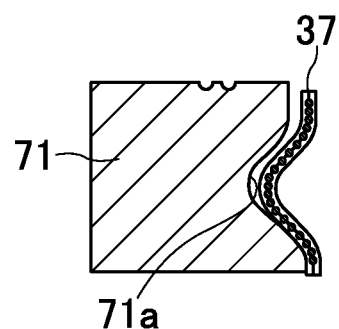
FIG. 4B is a second explanatory diagram for illustrating how the present boot seal according to Embodiment No. 1 is manufactured wherein the sheet subassembly is wound around the molding face of an inner mold.
Figure 4C:
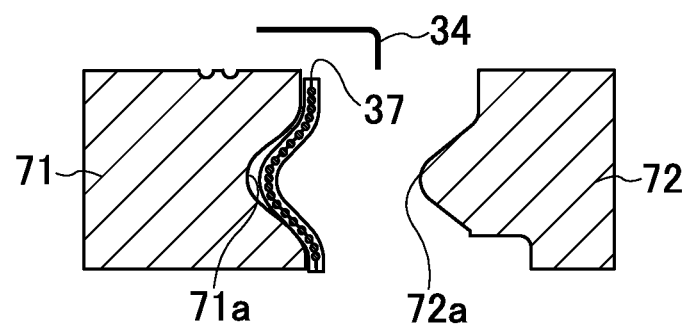
FIG. 4C is a third explanatory diagram for illustrating how the present boot seal according to Embodiment No. 1 is manufactured wherein not only the sheet subassembly is wound around the molding face of the inner mold but also a metallic ring, still another one of the constituent elements of the present boot seal, is put in place above the sheet subassembly.
Figure 4D:
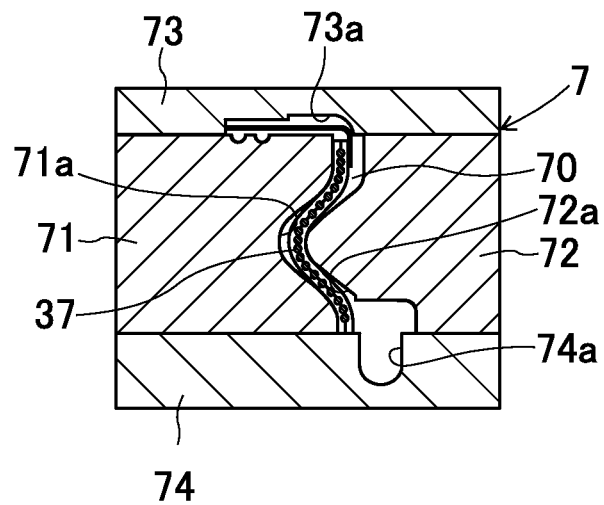
FIG. 4D is a fourth explanatory diagram for illustrating how the present boot seal according to Embodiment No. 1 is manufactured wherein a molding die is closed.

Subsequently, a die 7 is prepared, as shown in FIGS. 4D and 5. The die 7 comprises an inner mold 71, an outer mold 72, an upper mold 73, and a lower mold 74. The inner mold 71, the outer mold 72, the upper mold 73, and the lower mold 74 are provided with molding faces 71*a*, 72*a*, 73*a* and 74*a*, respectively. The molding faces 71*a*, 72*a*, 73*a* and 74*a* conform to the inner-face configuration, outer-face configuration, top-face configuration and bottom-face configuration of the present boot seal 3 according to Embodiment No. 1, respectively. As illustrated in FIG. 5, the outer mold 72 is divided into two submolds in the circumferential direction of the resulting present boot seal 3 according to Embodiment No. 1. When the submolds are closed, the outer mold 72 makes the molding face 72*a* that corresponds to the outer-face configuration of the present boot seal 3.

As illustrated in FIGS. 4B and 5, the outer mold 72 is opened in order to wrap the sheet subassembly 37 around the molding face 71*a* of the inner mold 71. Then, the sheet subassembly 37 is overlapped at the wrapping starting end 37*c* and the wrapping finishing end 37*d*. Note that the wrapping starting end 37*c* and the wrapping finishing end 37*d* are superimposed one another on one of the linearly-extending sides of the molding face 71*a*, as shown in FIG. 5. Then, as illustrated in FIG. 4C, the metallic ring 34 is put in place above the sheet subassembly 37.

As illustrated in FIG. 4D, the submolds of the outer mold 72 are moved closer to the inner mold 71, and the upper mold 73 and the lower mold 74 are moved closer to each other, thereby clamping the die 7. Thus, a cavity 70 is formed by the enclosing molding faces 71*a*, 72*a*, 73*a* and 74*a* of the inner mold 71, outer mold 72, upper mold 73 and lower mold 74. Note that the sheet subassembly 37 and the metallic ring 34 are put in place within the cavity 70 while providing clearances around them.

Figure 4E:
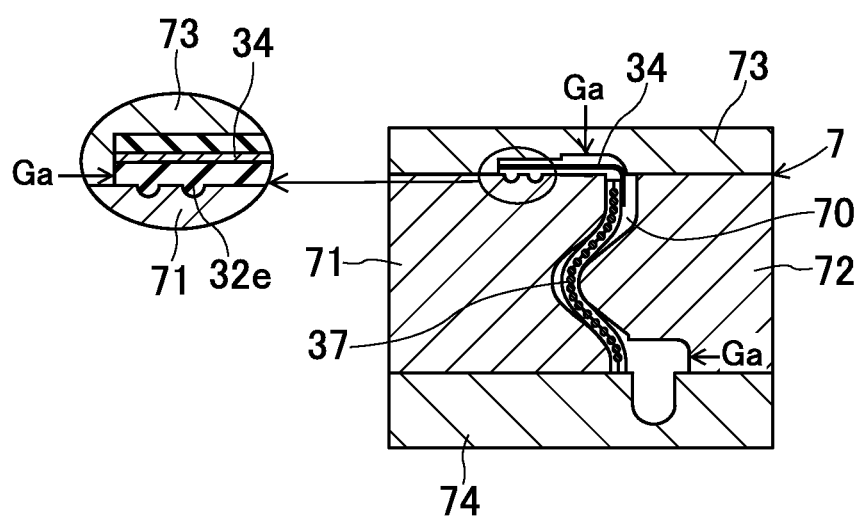
FIG. 4E is a fifth explanatory diagram for illustrating how the present boot seal according to Embodiment No. 1 is manufactured wherein how injection gates are located in the molding die is depicted.

As illustrated in FIG. 4E, an AEM material is injected into the clearances within the cavity 70 in order to complete the boot-seal element 30 by injection molding. Note that gates "Ga" for injecting the AEM material are located at mating sections between the upper mold 73 and the inner mold 71, and between the lower mold 74 and the outer mold 72.

The AEM material is held inside the heated die 7 for a given period of time in order to vulcanize the AEM material within the cavity 70 of the die 7. Thus, the boot seal 3 according to Embodiment No. 1 of the present invention is manufactured.

The present boot seal 3 according to Embodiment No. 1 comprises the cylindrically bellows-shaped deformer 31. The deformer 31 enables the present boot seal 3 to deform so as to follow the relative movements between the cylinder block 1 and the crankcase 2. As a result, the deformer 31 enables the present boot seal 3 to seal between the cylinder block 1 and the crankcase 2 airtightly.

The present boot seal 3 comprises the boot-seal element 30 being provided with the inner layer 30*a* on the inner face that is made of a fluorinated rubber. Since the fluorinated rubber exhibits good acid resistance and heat resistance, it is possible to inhibit the present boot seal 3 from deteriorating even when the boot-seal element 30 is exposed to the acidic and high-temperature blow-by gases on the inner face.

On the contrary, the boot-seal element 30 is provided with the outer layer 30*b* on the outer face that is made of a material other than the fluorinated rubber. Accordingly, the outer layer 30*b* enables manufacturers to make a used amount of the fluorinated rubber less for making the present boot seal 3 as a whole. Consequently, the outer layer 30*b* enables manufacturers to keep down the material cost lower for manufacturing the present boot seal 3.

Moreover, the cylindrical bellows-shaped boot-seal element 30 is provided with the reinforcement member 35. The reinforcement member 35 is disposed at least in the root 31*a* of the cylindrical bellows-shaped boot-seal element 30 that dents inward diametrically. Accordingly, the reinforcement member 35 enables the boot-seal element 30 to exhibit higher rigidity at the root 31*a*. Consequently, the reinforce member 35 makes it possible to inhibit the boot-seal element 30 from inverting outward diametrically at the root 31*a*.

In addition, the boot-seal element 30 is first formed in a circumferentially developed state. Then, the boot-seal element 30 is completed by overlapping the wrapping starting end 37*c* and the wrapping finishing end 37*d* in the circumferential direction. To put it differently, it is easy for manufacturers to make the boot-seal element 30. Therefore, the boot-seal element 30 enables manufacturers to manufacture the present boot seal 3 according to Embodiment No. 1 inexpensively.

Moreover, the net 35a exhibiting a meshed structure makes the reinforcement member 35. As a result, the net 35a not only enhances the strength of the boot-seal element 30 against deformations, but also enables the boot-seal element 30 to expand and contract slightly in the circumferential direction. Therefore, the net 35a enables the reinforcement member 35 to inhibit the boot-seal element 30 from inverting without ever preventing the boot-seal element 30 from expanding and contracting.

In addition, the reinforcement member 35 is put in place in the circumferential direction of the boot-seal element 30. The reinforcement member 35 is provided with the circumferential opposite ends that are superimposed one another. The section at which the circumferential opposite ends of the reinforcement member 35 overlap with each other makes a joint that is joined together by superimposing the wrapping starting end 37c of the sheet subassembly 37 and the wrapping finishing end 37d one another when manufacturing the present boot seal 3 according to Embodiment No. 1. Thus, the reinforcement member 35 exhibits an enhanced joint strength at the joint, because the circumferential opposite ends of the reinforcement member 35 overlap with each other at the joint. Moreover, the boot-seal element can preferably be joined at the circumferential ends seamlessly. In addition, the boot-seal element can preferably include a joint being made up of a mixture of a fluorinated elastomer and another elastomer other than the fluorinated elastomer.

Moreover, the reinforcement member 35 exhibits an enhanced joint strength at the interface between the inner layer 30a and the outer layer 30b, because the inner layer 30a and the outer layer 30b can be joined together at the meshes in the meshed structure of the reinforcement member 35. In addition, the thus joined inner layer 30a and outer layer 30b inhibit the boot-seal element 30 from deforming at the part where the reinforcement member 35 is put in place, because the inner layer 30a and outer layer 30b go into the meshes in the meshed structure of the reinforcement member 35.

In addition, the reinforcement member 35 includes the net 35a being made up of the woven yarns that incline with respect to the circumferential direction of the boot-seal element 30. As a result, not only the reinforcement member 35 allows the boot-seal element 30 to expand and contract slightly in the circumferential direction, but also the reinforcement member 35 can effectively inhibit the boot-seal element 30 from inverting.

Moreover, the reinforcement member 35 is laid out from the top end of the boot-seal element 30 to the bottom end entirely. Accordingly, the reinforcement member 35 reinforces the root 31a of the boot-seal element 30 as well as the upper part (especially around the cylinder-block fitting 32) where stresses are likely to concentrate when the present boot seal 3 according to Embodiment No. 1 expands and contracts. Consequently, the reinforcement member 35 can inhibit the present boot seal 3 from cracking, tearing or breaking at the parts.

Embodiment No. 2

Figure 6:
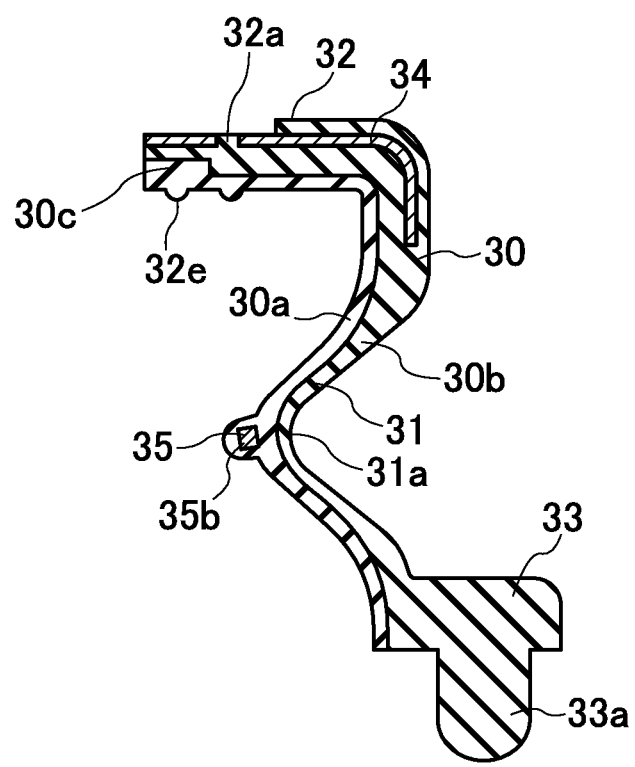
FIG. 6 is a cross-sectional diagram for illustrating a boot seal that is directed to Embodiment No. 2 of the present invention.

As illustrated in FIG. 6, a boot seal according to Embodiment No. 2 of the present invention is distinct from the present boot seal 3 according to Embodiment No. 1 in that it comprises an annular wire stock 35b, which serves as the reinforcement member 35, instead of the net 35a. In the present boot seal according to Embodiment No. 2, the annular wire stock 35b is composed of a metallic wire, or a resinous filament or fiber. The metallic wire can be made of stainless steel (SUS (as per Japanese Industrial Standard (JIS)), or Cu. The resinous filament or fiber can be made of aromatic polyamide or polyphenylene sulfide (or PPS). Note that aromatic polyamide or PPS exhibits a melting point that is higher than the temperature for vulcanizing the materials making the boot-seal element 30. Both wire and filament or fiber can be provided with irregularities at predetermined intervals in the extending direction. When the wire stock 35b is made of a resinous filament or fiber, the wire stock 35b can be fluffed or looped at predetermined intervals in the extending direction. To be concrete, the wire stock 35b can be made of decorative or fancy yarns, such as knotted yarns, nep yarns, flaky yarns, slabbed yarns, looped yarns, ringed yarns, tam-tam yarns, knopped yarns, moled yarns and walled yarns. If such is the case, since the wires and filaments or fibers are provided with irregularities on the surface, the irregularities can hook up the inner layer 30a of the boot-seal element 30 and the outer layer 30b. That is, the irregularities can prevent the inner layer 30a and outer layer 30b from misaligning with respect to (or detaching or coming off from) the annular wire stock 35b. Therefore, the resulting annular fluffed or looped wire stock 35b can inhibit the present boot seal according to Embodiment No. 1 from expanding diametrically in the circumferential direction.

Note that the annular wire stock 35b is buried inside the inner layer 30a of the boot-seal element 30 where the inner layer 30a makes the root 31a of the deformer 31 cooperatively with the outer layer 30b.

As can be seen from FIGS. 4A through 4E as well as FIG. 5, the annular wire stock 35b is set in place on the outer peripheral side of the section in the molding face 71a of the inner mold 71 for forming the root 31a of the boot-seal element 30. Then, the sheet subassembly 37, which comprises the FKM calender sheet 37a and the AEM calender sheet 37b, is wound around the molding face 71a. Finally, a raw AEM material is injected into the die 7 in order to subject the annular wire stock 35b to insert molding along with the sheet subassembly 37. Alternatively, the annular wire stock 35b can be extruded along with the sheet subassembly 37 in order to insert the wire stock 35b into the sheet subassembly 37 when extruding the sheet subassembly 37.

The present boot seal according to Embodiment No. 2 comprises the cylinder-block fitting 32 whose inner layer 30a is composed of an FKM elastomer, one of fluorinated rubbers, and whose outer layer 30b is composed of an AEM elastomer. For example, the inner layer 30a of the cylinder-block fitting 32 can be made of a fluorinated rubber as follows. First, a standby or precursor rubber 30c can be molded in advance with use of a fluorinated rubber. Then, the resulting standby or precursor rubber 30c can be put in place on the inner molding face in the inner mold 71 together with the sheet subassembly 37. Finally, a raw AEM material can be injected into the die 7.

Moreover, the present boot seal according to Embodiment No. 2 can comprise the cylinder-block fitting 32 that is composed of an AEM elastomer alone in the same manner as the present boot seal 3 according to Embodiment No. 1.

Embodiment No. 3

Figure 7:
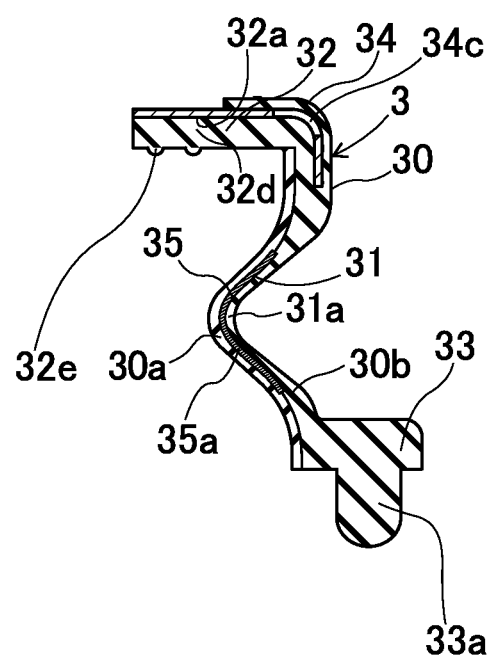
FIG. 7 is a cross-sectional diagram for illustrating a boot seal that is directed to Embodiment No. 3 of the present invention.

As illustrated in FIG. 7, a boot seal according to Embodiment No. 3 of the present invention is distinct from the present boot seal 3 according to Embodiment No. 1 in that it comprises a reinforcement member 35 that is disposed partially in the deformer 31 of the boot-seal element 30 alone. That is, the reinforcement member 35 is put in place in the root 31*a* of the deformer 31 of the boot-seal element 30 as well as around the top and bottom peripheries of the root 31*a*, but is not put in place at all in the cylinder-block fitting 32 and crankcase fitting 33 that make the top and bottom of the boot-seal element 30. A net 35*a*, which is similar to that of the present boot seal 3 according to Embodiment No. 1, is used to make the reinforcement member 35. The present boot seal according to Embodiment No. 3 can be manufactured as shown in FIGS. 4A through 4E, namely, by the same process as that for manufacturing the present boot seal 3 according to Embodiment No. 1.

When low inner pressures are exerted between the cylinder block 1 and the crankcase 2 so that small forces are applied to the root 31*a* of the deformer 31 in the boot-seal element 30, it is not necessarily required that the reinforcement member 35 be put in place all over in the boot-seal element 30. In this instance as well, the reinforcement member 35 can fully prevent the boot-seal element 30 from deforming against the low inner pressures, even when the reinforcement member 35 is put in place while providing it with equal extension allowances about the flexure point of the deformer 31 as having been described in the present boot seal according to Embodiment No. 3.

Embodiment No. 4

A boot seal according to Embodiment No. 4 of the present invention is distinct from the present boot seal 3 according to Embodiment No. 1 in that it comprises a reinforcement member 35 whose opposite ends are not superimposed one another in the thickness-wise direction. However, the reinforcement member 35 is put in place around the boot-seal element 30 entirely in the circumferential direction. Note that the opposite ends of the reinforcement member 35 do not overlap with each other at the circumferential opposite ends, although they come closer to each other at the circumferential opposite ends. Except for the thus made reinforcement member 35, the present boot seal according to Embodiment No. 4 comprises the same constituent elements as those of the present boot seal 3 according to Embodiment No. 1.

Figure 8:
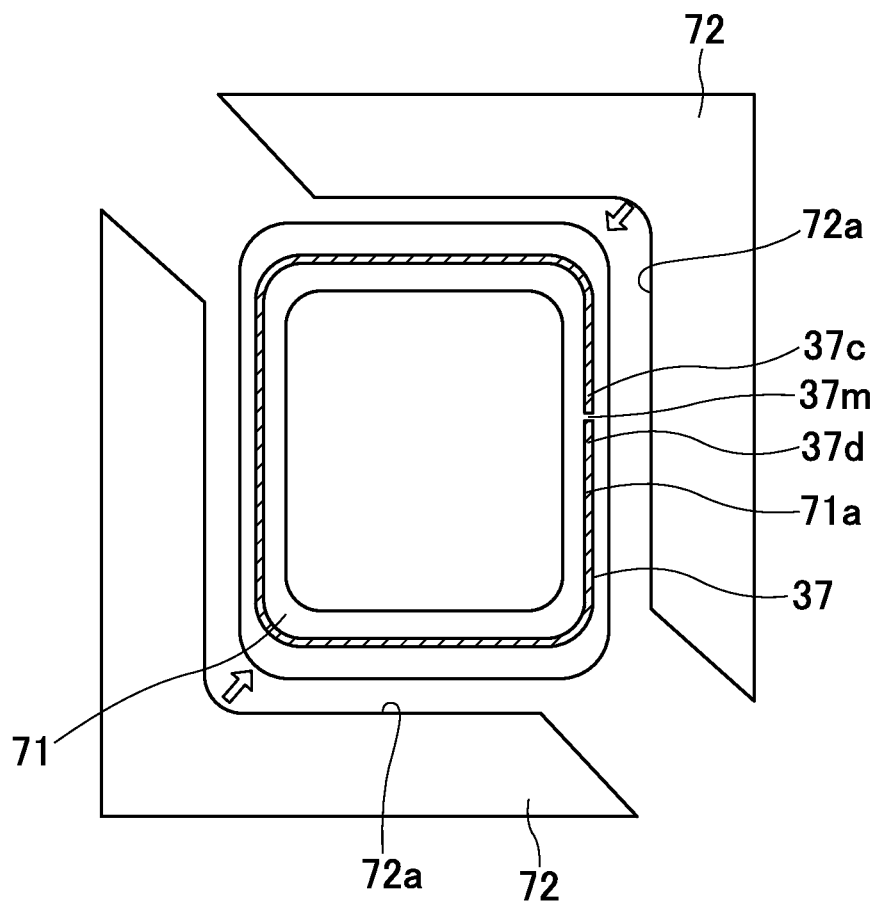
FIG. 8 is a plan-view diagram for illustrating how a boot seal that is directed to Embodiment No. 4 of the present invention is manufactured wherein how a sheet subassembly is put in place around an inner mold of a molding die is depicted.

Prior to manufacturing the present boot seal according to Embodiment No. 4, a sheet subassembly 37 is made in the same manner as the present boot seal 3 according to Embodiment No. 1. The sheet subassembly 37 comprises an unvulcanized FKM calender sheet 37*a*, an unvulcanized AEM calender sheet 37*b*, and the reinforcement member 35, as shown in FIG. 4A. Then, the resulting sheet subassembly 37 is wound around the molding face 71*a* of the inner mold 71, as shown in FIGS. 8 and 4B. Note that the wrapping starting end 37*c* of the sheet subassembly 37 and the wrapping finishing end 37*d* are not superimposed one another, although they are disposed to come closer to each other. As a result, a clearance 37*m* remains between the wrapping starting end 37*c* of the sheet subassembly 37 and the wrapping finishing end 37*d*, as shown in FIG. 8.

Then, as illustrated in FIGS. 4C through 4E, the die 7 is clamped after putting the metallic ring 34 in place above the sheet subassembly 37, moving the submolds of the outer mold 72 closer to the inner mold 71 and moving the upper mold 73 and the lower mold 74 closer to each other in the same manner as the above-described process for manufacturing the present boot seal 3 according to Embodiment No. 1. Thereafter, a raw AEM material is injected into the cavity 70 within the die 7, and is then vulcanized in the cavity 70. Upon vulcanizing the injected raw AEM material, the FKM elastic material making the FKM calender sheet 37*a* of the sheet subassembly 37, and the AEM elastic material making the AEM calender sheet 37*b* also flow into the clearance 37*m* between the wrapping starting end 37*c* of the sheet subassembly 37 and the wrapping finishing end 37*d*. Accordingly, the resultant FKM elastomeric material and AEM elastomeric material fill up the clearance 37*m*. Consequently, the sheet subassembly 37 is vulcanization bonded between the wrapping starting end 37*c* and the wrapping finishing end 37*d*.

When low inner pressures are exerted between the cylinder block 1 and the crankcase 2 so that small forces are applied to the root 31*a* of the deformer 31 in the boot-seal element 30, it is not necessarily required that the resulting reinforcement member 35 be superimposed one another at the circumferential opposite ends. In this instance as well, the reinforcement member 35 can fully prevent the boot-seal element 30 from deforming against the low inner pressures, even when the resultant reinforcement member 35 has opposite ends that do not overlap with each other in the thickness-wise direction as having been described in the present boot seal according to Embodiment No. 4.

Modified Embodiments

Hereinafter, some of modified embodiments of the boot seals according to Embodiment Nos. 1 through 4 of the present invention will be described.

Figure 9:
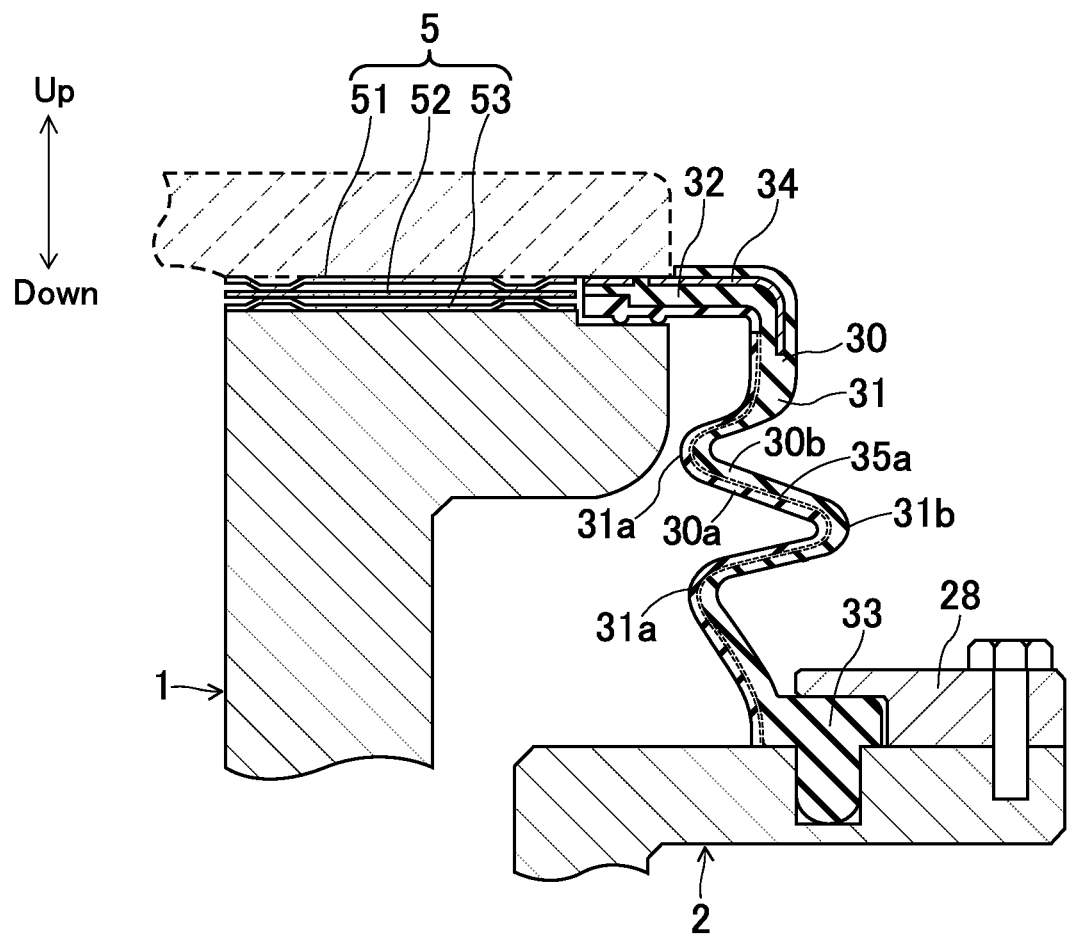
FIG. 9 is a cross-sectional diagram for illustrating a boot seal that is directed to a modified embodiment of the present invention, and which is mounted on a "VCR" engine.
Figure 10:
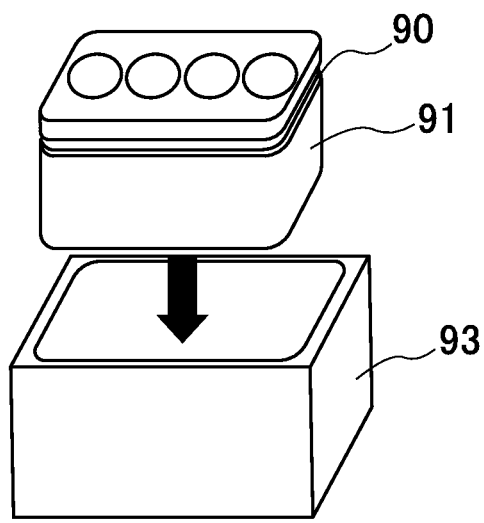
FIG. 10 is a perspective explanatory diagram for illustrating a cylinder block and a crankcase that are associated with a conventional boot seal for "VCR" engine.
Figure 11:
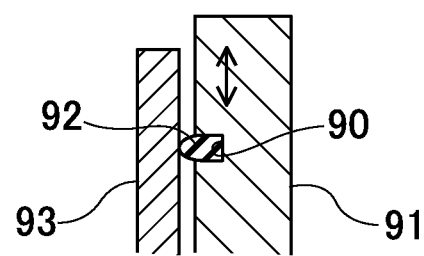
FIG. 11 is an enlarged cross-sectional diagram for illustrating a sealing mechanism in the conventional boot seal.

In the present boot seals according to Embodiment Nos. 1 through 4, the deformer 31 of the boot-seal element 30 is provided with one and only root 31*a*. However, as illustrated in FIG. 9, the deformer 31 can be provided with two or more roots 31*a*. That is, the deformer 31 of the boot-seal element 30 can be provided with a first root 31*a*, a crest 31*b*, and a second root 31*a*. For example, the first and second roots 31*a* dent inward diametrically, whereas the crest 31*b* protrudes outward diametrically. The deformer 31 being provided with two or more roots 31*a* enables the boot-seal element 30 to expand and contract greatly in the up/down direction while keeping down the diametric deformation magnitude less when the boot-seal element 30 expands and contracts. Although FIG. 9 illustrates a modified embodiment in which a net 35*a* is used for the reinforcement member 35, the modified embodiment shown in the drawing can comprise an annular wire stock 35*b* or a rib or detent for preventing the boot-seal element 30 from inverting, instead of the net 35*a*, or together with the net 35*a*.

In the present boot seals according to Embodiment Nos. 1 through 4, an AEM rubber or elastomer is used to make the outer layer 30*b* of the boot-seal element 30. However, the raw material for the outer layer 30*b* is not limited to the setup. It is even possible to use rubbers, such as acrylic rubbers (or ACM) and silicone rubbers, as well as thermoplastic elastomers, to make the outer layer 30*b*.

In the present boot seal 3 according to Embodiment No. 1, the net 35*a*, which serves as the reinforcement member 35, is put in place from the top end of the boot-seal element 30 to the bottom end entirely. However, as described in the present boot seal according to Embodiment No. 3, it is also allowable that the net 35*a* can be put in place adjacent to the root 31*a* of the deformer 31 alone in the boot-seal element 30. Moreover, it is even permissible to put the net 35*a* in a quantity of two or more separately at two locations at least, such as the root 31*a* of the deformer 31 and the cylinder-block fitting 32, where stresses are likely to concentrate.

In addition, instead of the net 35*a* that serves as the reinforcement member 35 in the present boot seal 3 according to Embodiment No. 1, a fibrous assembly like flat fibrous tapes, or a band-shaped woven or knitted assembly, can be buried in the vicinity of the root 31*a* of the deformer 31 in the boot-seal element 30. If such is the case, the fibrous assembly, or the band-shaped woven or knitted assembly, can disperse stresses, which are likely to concentrate on the root 31a of the deformer 30, in the facial direction of the boot-seal element 30. As a result, the fibrous assembly, or the band-shaped woven or knitted assembly, can relax the stress concentration at the root 31a. Moreover, the annular wire stock 35b that serves as the reinforcement member 35 in the present boot seal according to Embodiment No. 2 can be combined with the net 35a that serves as the reinforcement member 35 in the present boot seal 3 according to Embodiment No. 1 to make a cooperative set of reinforcement members. In addition, one of the opposite ends of the boot seal can preferably be made up of an elastomer other than the fluorinated rubber alone. Moreover, the elastomer other than the fluorinated rubber can preferably comprise at least one member being selected from the group consisting of ethylene acrylic rubbers, acrylic rubbers, silicone rubbers and thermoplastic elastomers. In addition, the one of the opposite ends of the boot seal can preferably be the opposite end to be fixed to the cylinder block. Moreover, the inner layer, and the outer layer can preferably make one of the opposite ends of the boot seal. In addition, the one of the opposite ends of the boot seal can preferably be the opposite end to be fixed to the cylinder block.

In addition to the modified embodiments as described above, it is feasible to change the above-described embodiments variously within ranges that do not deviate from the gist of the present invention, and then to result in making a boot seal according to the present invention.

Having now fully described the present invention, it will be apparent to one of ordinary skill in the art that many changes and modifications can be made thereto without departing from the spirit or scope of the present invention as set forth herein including the appended claims.

What is claimed is:

1. A boot seal for variable compression-rate engine, the boot seal being mounted onto a variable compression-rate engine that changes a volume of a combustion chamber by changing relative positions between a cylinder block and a crankcase, the boot seal covering between the cylinder block and the crankcase, and having an opposite end to be fixed to the cylinder block and another opposite end to be fixed to the crankcase, the boot seal comprising:
    a boot-seal element including an inner layer being disposed on an inner face thereof and being composed of a fluorinated rubber, and an outer layer being disposed on a more outer side than is the inner layer, the boot-seal element having an elastically deformable cylindrical bellows shape having a root that dents inward diametrically from being formed in a circumferentially developed state so as to have circumferential ends and then being completed by joining the circumferential ends with each other; and
    a reinforcement member including an annular reinforcement member extending annularly around the boot-seal element and over an entire circumferential direction of the boot-seal element and a reinforced fibrous assembly being disposed at least in the root of the cylindrical bellows-shaped boot-seal element between the inner layer of the boot-seal element and the outer layer, the reinforced fibrous assembly comprising woven yarns selected from woven and knitted fabrics made of reinforced fiber, exhibiting woven directions inclining with respect to the circumferential direction of the boot-seal element and having intersections of the woven yarn joined together.

2. The boot seal according to claim 1, wherein the reinforced fibrous assembly comprises a woven or knitted fabric exhibiting a meshed structure.

3. The boot seal according to claim 1, wherein the reinforced fibrous assembly is disposed so as to extend from the root of the boot-seal element to a part thereof to be fixed to the cylinder block at least.

4. The boot seal according to claim 1, wherein the reinforced fibrous assembly includes joints being joined in the circumferential direction of the boot-seal element and superimposed one on another in their thickness-wise directions.

5. The boot seal according to claim 1, wherein the annular reinforcement member includes a wire stock exhibiting a higher tensile strength than the boot-seal element; and
    the wire stock is buried in the root of the cylindrical bellows-shaped boot-seal element.

6. The boot seal according to claim 5, wherein the wire stock is provided with irregularities on a surface thereof at predetermined intervals in an extending direction thereof.

7. The boot seal according to claim 6, wherein the wire stock is fluffed or looped at predetermined intervals in the extending direction.

8. The boot seal according to claim 1, wherein the boot-seal element is joined at the circumferential ends seamlessly.

9. The boot seal according to claim 8, wherein the boot-seal element includes a joint being made up of a mixture of a fluorinated elastomer and another elastomer other than the fluorinated elastomer.

10. The boot seal according to claim 1, wherein one of the opposite ends of the boot seal is made up of an elastomer other than the fluorinated rubber alone.

11. The boot seal according to claim 10, wherein the elastomer other than the fluorinated rubber comprises at least one member being selected from the group consisting of ethylene acrylic rubbers, acrylic rubbers, silicone rubbers and thermoplastic elastomers.

12. The boot seal according to claim 10, wherein the one of the opposite ends of the boot seal is the opposite end to be fixed to the cylinder block.

13. The boot seal according to claim 1, wherein the inner layer, and the outer layer make one of the opposite ends of the boot seal.

14. The boot seal according to claim 13, wherein the one of the opposite ends of the boot seal is the opposite end to be fixed to the cylinder block.

15. The boot seal according to claim 1, wherein the reinforcing member inhibits the boot seal from expanding diametrically in the circumferential direction.

* * * * *